United States Patent

[11] 3,556,045

[72] Inventor Theodore M. Williams
847 Daytona Ave., Holly Hill, Fla. 32017
[21] Appl. No. 875,772
[22] Filed Nov. 12, 1969
[45] Patented Jan. 19, 1971

[54] STEERING WHEEL POSITION INDICATOR
6 Claims, 7 Drawing Figs.

[52] U.S. Cl. ................................................ 116/31
[51] Int. Cl. ................................................ B60q 1/42
[50] Field of Search ........................................... 116/31;
74/492; 340/(Inquired); 180/(Inquired);
280/(Inquired)

[56] References Cited
UNITED STATES PATENTS
| | | | |
|---|---|---|---|
| 1,337,848 | 4/1920 | Pendziwaiter | 116/31 |
| 2,048,429 | 7/1936 | Cole | 116/31 |
| 2,175,637 | 10/1939 | Pauli | 116/31 |
| 2,439,476 | 4/1948 | Zegget et al. | 116/31 |

FOREIGN PATENTS
| | | | |
|---|---|---|---|
| 1,119,333 | 4/1956 | France | 116/31 |

Primary Examiner—Louis J. Capozi
Attorney—John N. Randolph

ABSTRACT: An indicating device mounted on a stationary steering post having a wheel frictionally engaging the steering wheel hub and rotated by rotation of the steering wheel for turning a pointer to indicate the position of a boat rudder or the steerable wheels of a wheeled vehicle, to enable the operator to know in advance the initial direction of movement of the vehicle or boat. The indicating device is constructed for application to a steering post and steering wheel hub without any modification of said parts and is capable of being readily adjusted without detachment from the steering post, to center the pointer when the vehicle or boat is traveling in a straight forward direction or on a true course, respectively.

PATENTED JAN 19 1971

INVENTOR
THEODORE M. WILLIAMS

BY *John N. Randolph*

ATTORNEY

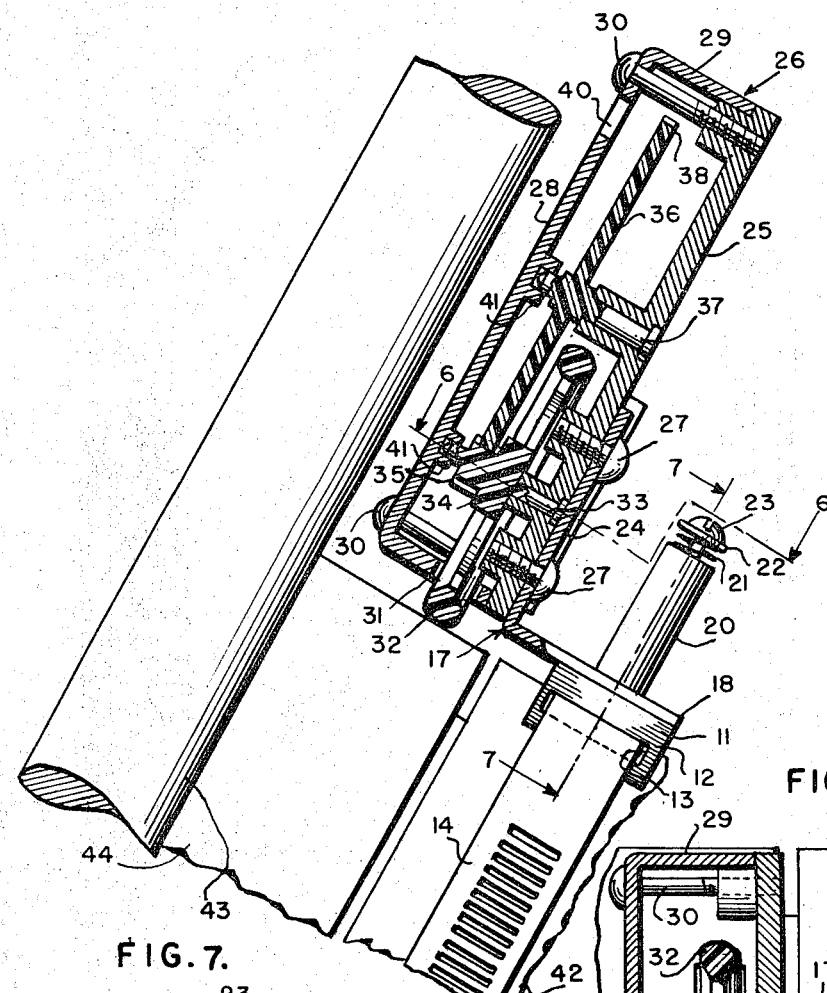
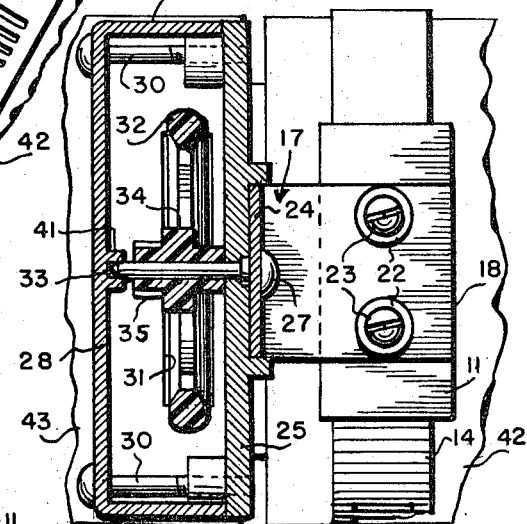
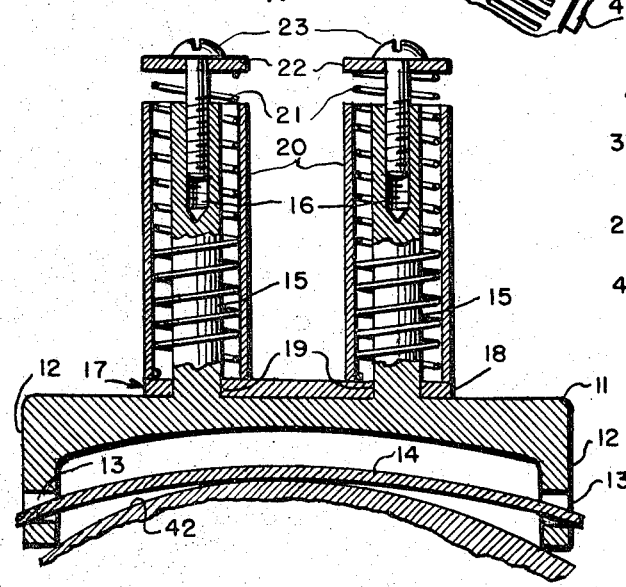

STEERING WHEEL POSITION INDICATOR

SUMMARY

Accidents frequently result due to the fact that the steering wheels or a vehicle or the rudder of a boat are turned to either the right or left so that when movement of the vehicle or boat is initiated, it executes an unexpected sharp turning movement which may result in a collision. This is especially true of boats where the rudder is not visible to the vehicle operator.

It is therefore a primary object of the present invention to provide an indicating device of extremely simple construction, located in a position to be readily viewed by an operator for visually indicating the position of the steerable wheels or rudder before movement of the vehicle or boat is initiated, to enable the operator to determine the direction of the initial travel and, if necessary to turn the steering wheel to correct the position of the rudder or the steerable wheels before movement is initiated.

Another object of the present invention is to provide a steering wheel indicator of extremely simple construction which may be very economically manufactured and sold and which may be readily applied to a steering post and steering wheel hub.

A further object of the invention is to provide an indicator which may be readily adjusted manually without detachment from the steering post, to center an indicating pointer to correctly indicate that the steerable wheels of a vehicle are parallel to its longitudinal axis, that the plane of the rudder is parallel to the longitudinal axis of a boat, or that the boat is traveling on a true course.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 5 is a sectional view, partly in elevation, taken substantially along the line 5–5 of FIG. 4;

FIG. 6 is a transverse sectional view, taken substantially along the line 6–6 of FIG. 5; and FIG. 7 is an enlarged fragmentary sectional view, taken substantially along a plane as indicated by the line 7–7 of FIG. 5.

DESCRIPTION OF THE PREFERRED EMBODIMENT

Figure 1:
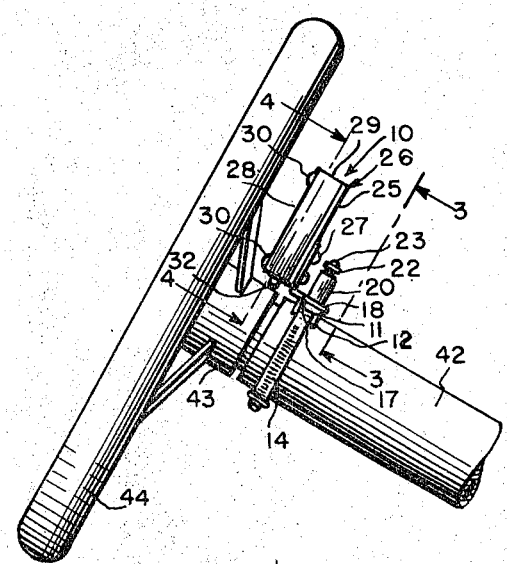
FIG. 1 is a side elevational view of a conventional steering wheel and a part of a steering post and showing the indicator in an applied position thereon.

Referring more specifically to the drawings, the steering wheel position indicator in its entirety and comprising the invention is designated generally 10 and includes an elongated base member 11, as best seen in FIG. 7, having downturned ends 12 provided with slots 13 through which extend portions of a conventional hose clamp 14. Two posts 15 are fixed to and extend from the upper side of the base 11 and have upwardly openings threaded sockets 16.

An angular bracket 17 has a bottom leg 18 a portion of which rests on said upper surface of the base 11 and which is provided with transversely spaced openings 19 through which the posts 15 extend. Sleeves 20 are fixed to and extend upwardly from the bracket part 18 and are disposed concentrically around and spaced from the openings 19 and post 15, to house compression springs 21 which are disposed within said sleeves 20 and around the posts 15 and which extend above the upper ends of the posts and sleeves and bear against washers 22. Headed screws 23 extend downwardly through the washers 22 and threadedly engage in the sockets 16 for compressing the springs 21 which yieldably urge the bracket part 18 against the base 11. Screws 23 can be adjusted for adjusting the tension of the springs 21.

The other upstanding leg 24 of the bracket 17 is secured to the outer side of the rear wall 25 of a housing or casing 26 by screw fastenings 27. The housing 26 includes a front wall 28 having a marginal rearwardly extending flange 29 forming a continuous surrounding wall of the housing 26 and which abuts against the marginal portion of the inner or front side of the rear wall 25. The front wall 28 is secured to the rear wall 25 at its top center and bottom corners by headed screw fastenings 30.

The bottom portion of the casing wall 29 has a slot 31 extending longitudinally thereof through which a portion of the rim of a friction wheel 32 projects outwardly from the casing 26. The wheel 32 is journaled on an axle 33 which is supported by the casing walls 25 and 28. The hub 34 of the wheel 32 has a laterally projecting pinion 35 which meshes with the teeth of a gear wheel 36, which is disposed in the casing 26 and journaled on an axle 37 which is also supported by the casing walls 25 and 28 and which is disposed above the friction wheel 32. The gear wheel 36 is forwardly offset relative to the friction wheel 32 and has a pointer 38 projecting from a part of its periphery located between the ends of its interrupted toothed peripheral portion 39. The pointer 38 is visible through an arcuate slot or window 40 in the front wall 28, which is of sufficient length and proper curvature so that said pointer remains visible throughout its arc of travel. The front wall 28 has inwardly opening sockets 41 in which the axles 33 and 37 engage to permit application and removal of said casing walls 28 and 29 when the fastenings 30 are removed.

The clamp 14 is secured around a stationary steering post 42 for supporting the base 11 and bracket 17 thereabove and with the casing 26 located under the steering wheel 43, so that a part of the periphery of the friction wheel 32 will contact the steering wheel hub 44 which revolves with the steering wheel relative to the post 42.

Figure 2:
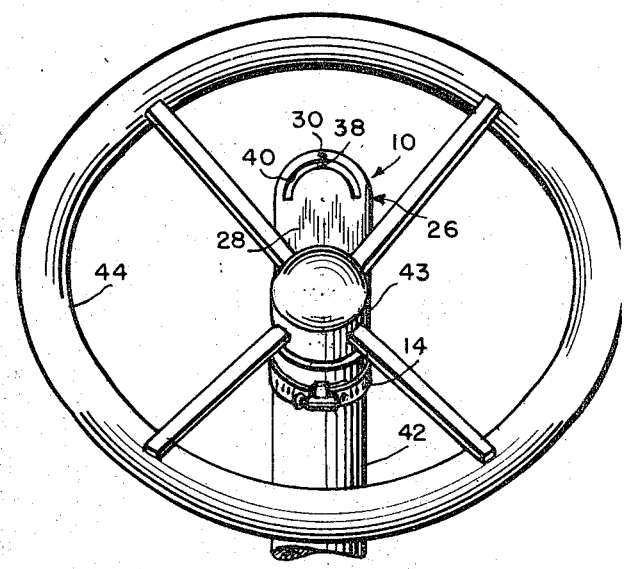
FIG. 2 is a front elevational view thereof looking from left to right of FIG. 1.
Figure 4:
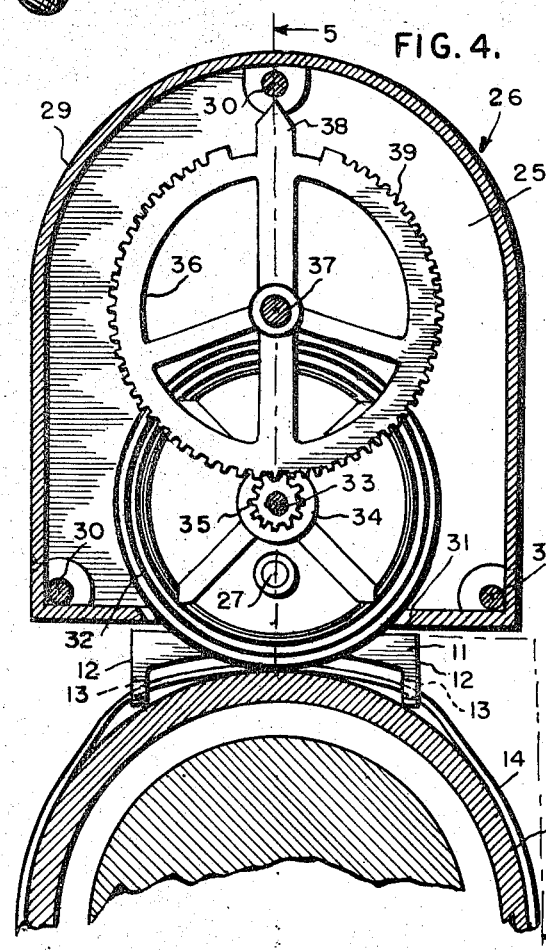
FIG. 4 is an enlarged fragmentary sectional view, taken substantially along a plane as indicated by the line 4–4 of FIG. 1.
Figure 3:
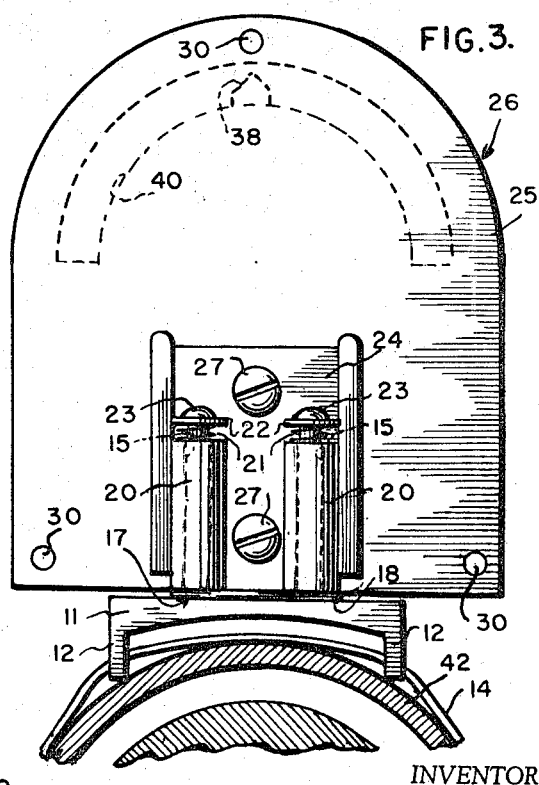
FIG. 3 is an enlarged fragmentary sectional view, primarily in elevation, taken substantially along a plane as indicated by the line 3–3 of FIG. 1.

It will thus be seen that when the steering wheel 43 and its hub 44 are rotated in either direction, the wheel 32 will be caused to turn in the opposite direction for turning the gear 36 in the opposite direction to the wheel 32 and in the same direction as the hub 44 for causing the pointer to swing behind the window 40. Thus, if the pointer has been initially oriented relative to the steering wheels of a vehicle or the rudder of a boat, not shown, to which the steering wheel is connected, so that the pointer 38 is in a top dead center position, as seen in FIGS. 2 and 4, when the steerable wheels are disposed parallel to the longitudinal axis of the vehicle or the rudder is disposed parallel to the longitudinal axis of the boat, the position of the pointer will indicate the position of the steerable wheels or rudder before movement of the vehicle or boat is initiated, so that the vehicle or boat will not initially execute an unexpected turning movement which might cause a collision.

It will be readily apparent that the bracket 17 and casing 26 can be lifted relative to the base 11 against the pressure of the springs 21 to enable the friction wheel 32 to be manually turned for adjusting or orienting the pointer relative to the steerable wheels or rudder. This adjustment can be made for a boat which is underway and which is on a correct course to compensate for current, wind or the like, tending to turn the boat away from its course and requiring the movement of the steering wheel to swing the rudder away from a straight line position lengthwise of the boat, necessary to maintain the boat on course.

The wheel 32 and gear 36 may be formed of plastic or other suitable material and the rim of the wheel 32 may be rough or otherwise modified to provide a good frictional engagement with the hub 44. This frictional engagement can be varied by adjusting the screws 23.

Various modifications and changes are contemplated and may be resorted to, without departing from the function or scope of the invention.

I claim:

1. A steering wheel position indicator comprising a casing, a friction wheel rotatably mounted in said casing and having a peripheral portion thereof projecting therefrom, an indicating pointer, means supported by the casing and supporting the pointer for swinging movement within and relative to the casing and in a position to be viewed from externally of the casing throughout its arc of travel, means forming a driving connection between the friction wheel and pointer for causing the pointer to be swung by rotation of the friction wheel, and means adapted to be secured to a steering post and supporting the casing with said peripheral portion of the friction wheel in direct frictional engagement with a steering wheel hub to be rotated by rotation of the steering wheel and hub.

2. A steering wheel position indicator as in claim 1, said means supporting the pointer for swinging movement including a gear wheel rotatably mounted in the casing and from which said pointer projects, and a pinion carried by the friction wheel and meshing with said gear wheel and combining therewith to form said means constituting the driving connection between the friction wheel and pointer.

3. A steering wheel position indicator as in claim 1, said means supporting the casing comprising means yieldably urging the casing toward the steering wheel hub for yieldably retaining the friction wheel in engagement with the steering wheel hub and to permit displacement of the friction wheel out of engagement with said hub for orienting the pointer by manual rotation of the friction wheel.

4. A steering wheel position indicator as in claim 3, and means for manually adjusting the tension of said yieldable means.

5. A steering wheel position indicator as in claim 1, said casing having an arcuate viewing opening behind which said pointer is disposed for swinging movement.

6. A steering wheel position indicator as in claim 1, said means supporting the casing comprising a base member, a hose clamp embracing the steering post and securing the base member thereto, posts rising from said base member, an angular bracket having a first leg resting on said base member and provided with openings through which the posts project, compression springs surrounding said posts and bearing on said bracket leg, spring stops bearing on said springs and adjustably connected to the posts, and said bracket having a second upstanding leg secured to the casing.